(12) United States Patent
Liu et al.

(10) Patent No.: US 10,339,798 B2
(45) Date of Patent: Jul. 2, 2019

(54) INFRARED REMOTE CONTROL APPARATUS AND TERMINAL

(71) Applicant: HUAWEI TECHNOLOGIES CO., LTD., Shenzhen, Guangdong (CN)

(72) Inventors: Haodong Liu, Shanghai (CN); Chenlong Li, Beijing (CN); Che Xie, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/857,719

(22) Filed: Dec. 29, 2017

(65) Prior Publication Data
US 2018/0190108 A1    Jul. 5, 2018

(30) Foreign Application Priority Data
Dec. 30, 2016   (CN) .......................... 2016 1 1260926

(51) Int. Cl.
*H04R 3/08*      (2006.01)
*G05B 15/02*     (2006.01)
(Continued)

(52) U.S. Cl.
CPC .............. *G08C 23/04* (2013.01); *H04R 3/08* (2013.01); *G05B 15/02* (2013.01); *G08C 2201/93* (2013.01)

(58) Field of Classification Search
CPC ........ H04B 10/00; H04R 3/08; H04R 1/1041; G05B 15/02; G08C 23/04; H03F 3/45076; H03F 3/183
(Continued)

(56) References Cited

U.S. PATENT DOCUMENTS 9,800,217 B1 * 10/2017 Gandolfi ............. H03F 3/45076
2003/0035406 A1 * 2/2003 Fraser ............... H04M 1/72502
370/347
(Continued)

FOREIGN PATENT DOCUMENTS

CN    101873454 A    10/2010
CN    202650237 U    1/2013
(Continued)

OTHER PUBLICATIONS

Extended European Search Report issued in European Application No. 17208582.1 dated May 18, 2018, 5 pages.
(Continued)

*Primary Examiner* — Oommen Jacob
(74) *Attorney, Agent, or Firm* — Fish & Richardson P.C.

(57) ABSTRACT

Embodiments of the present disclosure provide an infrared remote control apparatus and a terminal. The infrared remote control apparatus includes an audio codec chip, a transfer switch, and an infrared transmitter. The audio codec chip includes a pair of differential output pins. The infrared transmitter is connected to the differential output pins by using the transfer switch. The audio codec chip is configured to obtain an infrared remote control parameter that includes an envelope length and a carrier frequency of an infrared remote control signal. An infrared remote control signal is generated according to the envelope length and the carrier frequency. When the transfer switch sets up a connection between the infrared transmitter and the differential output pins, the audio code chip is configured to drive, by using the differential output pins, the infrared transmitter to transmit the infrared remote control signal.

19 Claims, 7 Drawing Sheets

(51) Int. Cl.
*G08C 23/04* (2006.01)
*H04B 7/212* (2006.01)
*H04R 3/02* (2006.01)
*H04L 27/06* (2006.01)
*H04N 7/14* (2006.01)
*H04N 7/18* (2006.01)

(58) Field of Classification Search
USPC .................................................. 398/106, 107
See application file for complete search history.

(56) References Cited

U.S. PATENT DOCUMENTS

| | | | | |
|---|---|---|---|---|
| 2004/0208182 | A1* | 10/2004 | Boles | G06F 8/65 370/395.5 |
| 2006/0210278 | A1* | 9/2006 | Cregg | G08C 23/04 398/107 |
| 2007/0041589 | A1* | 2/2007 | Patel | H04M 1/6066 381/73.1 |
| 2008/0049913 | A1* | 2/2008 | Liu | H04M 1/2535 379/90.01 |
| 2008/0056411 | A1* | 3/2008 | Flachs | H04L 25/0262 375/340 |
| 2008/0066121 | A1* | 3/2008 | Chuang | G08C 17/02 725/81 |
| 2008/0253472 | A1* | 10/2008 | Griep | G08C 23/04 375/295 |
| 2009/0134948 | A1* | 5/2009 | Miwa | G08C 23/04 332/112 |
| 2010/0271560 | A1 | 10/2010 | Higuchi et al. | |
| 2011/0032233 | A1* | 2/2011 | Nishimura | H03F 3/3022 345/211 |
| 2011/0216929 | A1* | 9/2011 | Jang | H04R 25/00 381/321 |
| 2011/0317036 | A1* | 12/2011 | Lim | H04N 5/3658 348/231.99 |
| 2012/0225645 | A1 | 9/2012 | Sivan | |
| 2016/0118971 | A1* | 4/2016 | Sugiyama | H03K 5/249 345/691 |
| 2016/0240185 | A1* | 8/2016 | Park | G10K 11/178 |
| 2017/0223801 | A1* | 8/2017 | Gan | H05B 37/029 |
| 2018/0190108 | A1* | 7/2018 | Liu | G08C 23/04 |

FOREIGN PATENT DOCUMENTS

| | | |
|---|---|---|
| CN | 103152104 A | 6/2013 |
| CN | 103258418 A | 8/2013 |
| CN | 203630990 U | 6/2014 |
| CN | 105898486 A | 8/2016 |
| JP | 2006005426 A | 1/2006 |

OTHER PUBLICATIONS

Chinese Office Action issued in Chinese Application No. 20161126096.x dated Dec. 14, 2018, 6 pages.

* cited by examiner

INFRARED REMOTE CONTROL APPARATUS AND TERMINAL

CROSS-REFERENCE TO RELATED APPLICATION

This application claims priority to Chinese Patent Application No. 201611260926.X, filed on Dec. 30, 2016, which is hereby incorporated by reference in its entirety.

TECHNICAL FIELD

The present invention relates to the field of infrared remote control technologies, and in particular, to an infrared remote control apparatus and a terminal.

BACKGROUND

Currently, there are generally two manners of implementing infrared remote control on a terminal such as a smartphone. In one manner, a switch of an infrared transmitter is controlled by using general purpose input/output (General Purpose Input/Output, GPIO) of a system on chip (System on Chip, SOC), to form an infrared remote control modulation signal using pulse-width modulation (Pulse Width Modulation, PWM). However, in this manner, infrared remote control learning cannot be implemented. When a code word corresponding to an infrared remote controller cannot be found in a code library, the terminal cannot work properly. In the other manner, a dedicated infrared remote control chip is used to implement infrared remote control. In this case, infrared remote control learning can also be implemented. An existing infrared remote control chip transmits a signal in a single-ended mode. During infrared transmission, the infrared remote control chip constructs a current signal of a PWM waveform by controlling a level signal at an output end that is connected to an infrared transmitter, so as to control the infrared transmitter to transmit a corresponding infrared remote control modulation signal. During infrared learning, a voltage generated by the infrared transmitter by means of a photoelectric effect is superimposed onto a power supply voltage, and the infrared remote control chip analyzes and stores corresponding code word data by identifying the voltage generated by the infrared transmitter by means of the photoelectric effect. However, in this manner, because the dedicated infrared remote control chip is required, costs are inevitably high. Because the infrared remote control chip transmits a signal in the single-ended mode, anti-interference performance of the signal is poor in both infrared learning and infrared transmission. In addition, because an anti-interference capability of a learning circuit in a single-ended current source mode is limited, there are some limitations in terms of infrared learning algorithm support, infrared learning accuracy control, and the like. All these are unfavorable for improving infrared remote control performance.

SUMMARY

Embodiments of the present invention provide an infrared remote control apparatus and a terminal. An audio codec chip of the terminal is used to generate an infrared remote control signal, so as to reduce costs for implementing self-learning infrared remote control on the terminal, and improve anti-interference performance of the infrared remote control signal.

A first aspect of the embodiments of the present invention provides an infrared remote control apparatus, including an audio codec chip, a transfer switch, and an infrared transmitter, where the audio codec chip includes a pair of differential output pins; the infrared transmitter is connected to the differential output pins by using the transfer switch; and the audio codec chip is configured to: obtain an infrared remote control parameter, where the infrared remote control parameter includes an envelope length and a carrier frequency of an infrared remote control signal; generate the infrared remote control signal according to the envelope length and the carrier frequency; and when the transfer switch sets up a connection between the infrared transmitter and the differential output pins, drive, by using the differential output pins, the infrared transmitter to transmit the infrared remote control signal.

The infrared remote control apparatus uses the audio codec chip to generate the infrared remote control signal. This can effectively reduce costs for implementing infrared remote control. In addition, the infrared remote control signal is transmitted by using a differential signal. This can effectively improve an anti-interference capability of the infrared remote control apparatus. In addition, the audio codec chip directly drives, by using the differential output pins, the infrared transmitter to transmit the infrared remote control signal, and there is no need to provide an independent power supply for the infrared transmitter. This helps to reduce power consumption of the infrared remote control apparatus.

In an implementation, the audio codec chip further includes a pair of differential input pins. The infrared transmitter is also connected to the differential input pins by using the transfer switch. The infrared transmitter is further configured to obtain an infrared learning signal. The audio codec chip is further configured to: when the transfer switch sets up a connection between the infrared transmitter and the differential input pins, read the infrared learning signal by using the differential input pins, calculate an envelope length and a carrier frequency of the infrared learning signal, and use the envelope length and the carrier frequency of the infrared learning signal as the envelope length and the carrier frequency of the infrared remote control signal, respectively.

The infrared remote control apparatus uses the audio codec chip to perform processing on the infrared learning signal. This can effectively reduce costs for implementing self-learning infrared remote control. In addition, the infrared learning signal is transmitted by using a differential signal. This can effectively increase an anti-interference capability of the infrared remote control apparatus, and improve infrared learning performance of the infrared remote control apparatus.

In an implementation, the transfer switch includes a first input pin, a second input pin, a first output pin, a second output pin, a first input/output pin, a second input/output pin, and a control pin, where the first input pin and the second input pin are connected to a positive pin and a negative pin of the differential output pins, respectively; the first output pin and the second output pin are connected to a positive pin and a negative pin of the differential input pins, respectively; the first input/output pin and the second input/output pin are connected to a positive pole and a negative pole of the infrared transmitter, respectively; and the control pin is configured to input a switching control signal, where the switching control signal is used to control the transfer switch to connect the first input/output pin and the second input/ output pin to the first input pin and the second input pin, respectively, or to the first output pin and the second output pin, respectively.

In an implementation, the audio codec chip further includes a digital signal processor, a digital-to-analog converter, and a first operational amplifier, where an output end of the digital signal processor is connected to an input end of the digital-to-analog converter; a positive differential signal output end and a negative differential signal output end of the digital-to-analog converter are connected to a positive input end and a negative input end of the first operational amplifier, respectively; a positive output end and a negative output end of the first operational amplifier are connected to a positive pin and a negative pin of the differential output pins, respectively; the digital signal processor is configured to generate a digital modulation signal according to the infrared remote control parameter; the digital-to-analog converter is configured to convert the digital modulation signal into a pair of differential infrared remote control signals; and the first operational amplifier is configured to amplify the differential infrared remote control signals, and drive the infrared transmitter by using the differential infrared remote control signals.

In an implementation, the audio codec chip further includes a second operational amplifier and an analog-to-digital converter, where a positive input end and a negative input end of the second operational amplifier are connected to a positive pin and a negative pin of the differential input pins, respectively; a positive output end and a negative output end of the second operational amplifier are connected to a positive differential signal input end and a negative differential signal input end of the analog-to-digital converter, respectively; an output end of the analog-to-digital converter is connected to an input end of the digital signal processor; the second operational amplifier is configured to amplify the infrared learning signal; the analog-to-digital converter is configured to convert the infrared learning signal into a digital learning signal; and the digital signal processor is further configured to calculate the envelope length and the carrier frequency of the infrared learning signal according to the digital learning signal.

In an implementation, the infrared remote control parameter includes an envelope length and a carrier frequency, and the audio codec chip is further configured to: calculate first level duration and second level duration of an infrared remote control signal according to the envelope length, and calculate a carrier period according to the carrier frequency; calculate, according to the first level duration and the carrier period, a quantity of carrier periods that need to be sent in the first level duration; if the quantity of the carrier periods that need to be sent in the first level duration is a non-integer, round up the quantity of the carrier periods, and add a corresponding zero-fill time after the first level duration, where a length of the zero-fill time is equal to a length by which a rounded-up quantity of carrier periods exceeds the quantity of the carrier periods that need to be sent in the first level duration; and subtract the zero-fill time from the second level duration, and calculate, according to a length of second level duration obtained after the zero-fill time is subtracted, a quantity of zero levels that need to be sent in the second level duration.

When the quantity of the carrier periods that need to be sent in the first level duration is a non-integer, the quantity of the carrier periods is rounded up to obtain an integer, and the zero-fill time corresponding to a length, by which a rounded-up quantity of the carrier periods exceeds the quantity of the carrier periods that need to be sent in the first level duration, is added after the first level duration. This ensures that the first level duration plus the zero-fill time is exactly an integer multiple of the carrier period, so as to prevent occurrence of an accumulative error.

In an implementation, the audio codec chip is further configured to: generate multiple consecutive carrier points in the first level duration and the zero-fill time, where two adjacent carrier points are separated by one carrier period; generate multiple consecutive zero level points in the second level duration obtained after the zero-fill time is subtracted; and generate, according to the multiple consecutive carrier points and the multiple consecutive zero level points, the infrared remote control signal corresponding to the infrared remote control parameter.

In an implementation, the audio codec chip is further configured to: sample the infrared learning signal by using a first sampling frequency, to obtain a first sampled signal, and down-sample the first sampled signal by using a second sampling frequency, to obtain a second sampled signal; and calculate the envelope length of the infrared learning signal according to the second sampled signal, and calculate first level duration and second level duration of the infrared learning signal according to the envelope length, where the first sampling frequency is a maximum sampling frequency of the audio codec chip, and the second sampling frequency is less than the first sampling frequency.

An envelope of the infrared learning signal is a low frequency signal, and a relatively low sampling frequency can meet a signal restoration requirement. Therefore, when the envelope length of the infrared learning signal is calculated, the first sampled signal may be down-sampled by using the lower second sampling frequency, so as to obtain the second sampled signal, and then, the second sampled signal is processed by using the audio codec chip, so as to calculate the envelope length. Compared with the solution in which the envelope length is directly calculated by using the first sampled signal, this solution can effectively reduce a signal processing load of the audio codec chip and reduce power consumption for infrared learning.

In an implementation, the audio codec chip is further configured to: sample the infrared learning signal by using a first sampling frequency, to obtain a first sampled signal; search in a preset time window to find whether there are consecutive high level sampling points in the first sampled signal; if there are consecutive high level sampling points, calculate a carrier frequency in the preset time window according to the first sampled signal; and sequentially calculate carrier frequencies in multiple consecutive preset time windows, and determine the carrier frequency of the infrared learning signal according to the carrier frequencies in the multiple consecutive preset time windows.

A search is performed based on the preset time window, to find a high level sampling point in the first sampled signal. If there are consecutive high level sampling points in the first sampled signal, the carrier frequency in the preset time window is calculated according to the first sampled signal in the preset time window. The carrier frequency of the infrared learning signal is determined by sequentially calculating the carrier frequencies in the multiple consecutive preset time windows. This effectively reduces operational resource consumption during carrier learning, and helps to improve carrier learning efficiency.

In an implementation, the audio codec chip is further configured to: search, in the preset time window according to a preset search spacing, to find whether there is a high level sampling point in the first sampled signal; and if there is a high level sampling point, search in a first preset range including the high level sampling point, to find whether there are consecutive high level sampling points.

A search is performed in the first preset range including the high level sampling point, to find whether there are consecutive high level sampling points. This can effectively prevent noise signal interference, exclude a case in which the high level sampling point is a noise signal, and ensure reliability of carrier frequency learning.

In an implementation, the audio codec chip is further configured to calculate, according to the first sampled signal, a carrier frequency of the infrared learning signal in the preset time window in a second preset range including the high level sampling point, where the second preset range includes the first preset range.

A second aspect of the embodiments of the present invention provides a terminal, including a memory and the infrared remote control apparatus according to any one of the first aspect of the embodiments of the present invention or the implementations thereof, where the memory is coupled to an audio codec chip and is configured to store an infrared remote control parameter of the infrared remote control apparatus.

In an implementation, the memory is further configured to: when the infrared remote control apparatus obtains an infrared learning signal by using an infrared transmitter, and obtains, by means of calculation, an envelope length and a carrier frequency of the infrared learning signal, store the envelope length and the carrier frequency of the infrared learning signal as the infrared remote control parameter of the infrared remote control apparatus.

According to the infrared remote control apparatus and the terminal provided in the embodiments of the present invention, both transmitting of the infrared remote control signal and receiving of the infrared learning signal are implemented by means of differential transmission. Therefore, an anti-interference capability against a noise signal is strong, an EMI anti-interference device such as a magnetic bead and a filter capacitor can be saved, and an area occupied by the infrared remote control circuit on a board is reduced. In addition, a DSP resource inside the audio codec chip of an audio frequency circuit is directly used to process the infrared remote control signal and the infrared learning signal, and an independent infrared codec chip is not required. This can effectively reduce costs for implementing infrared remote control. In addition, because a differential signal can directly drive the infrared transmitter, there is no need to set an independent power supply for the infrared transmitter. This helps to further reduce generation costs.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

The following describes the embodiments of the present invention with reference to accompanying drawings.

In the embodiments of the present invention, an audio frequency circuit of a terminal is used to generate an infrared remote control signal and process an infrared learning signal, so as to reduce costs for implementing self-learning infrared remote control on the terminal and improve anti-interference performance of the infrared remote control signal. It can be understood that the terminal may be but is not limited to a mobile phone, a tablet computer, a personal digital assistant (Personal Digital Assistant, PDA), a point of sales (Point of Sales, POS), an in-vehicle computer, and the like. In this embodiment, the mobile phone is used as an example of the terminal for describing a structure and a function of the terminal.

Figure 1:
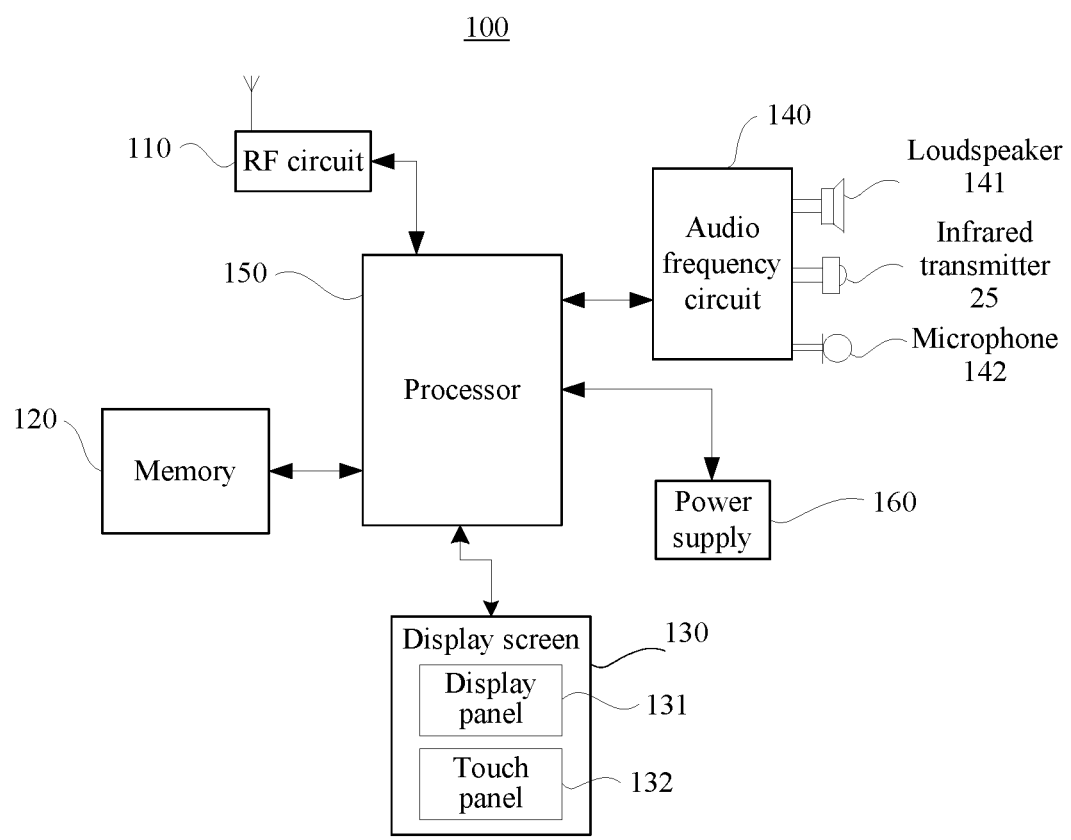
FIG. 1 is a schematic structural diagram of a terminal according to an embodiment of the present invention.

Referring to FIG. 1, an embodiment of the present invention provides a terminal 100, including components such as an RF (Radio Frequency, radio frequency) circuit 110, a memory 120, a display screen 130, an audio frequency circuit 140, a processor 150, and a power supply 160. A person skilled in the art can understand that a structure of the terminal shown in FIG. 1 does not constitute a limitation on the terminal, and the terminal may include more or fewer components than those shown in the figure, or a combination of some components, a part of some components, or components disposed differently.

The RF circuit 110 may be configured to: receive and send information, or receive and send a signal during a call, and in particular, after receiving downlink information of a base station, send the downlink information to the processor 150 for processing; and send related uplink data to the base station. The memory 120 may be configured to store a software program and a module. The processor 150 runs the software program and the module that are stored in the memory 120, so as to execute various functions and applications of the terminal 100 and data processing. The memory 120 may mainly include a program storage area and a data storage area. The program storage area may store an operating system, an application program required by at least one function (for example, a sound playback function and an infrared remote control function), and the like. The data storage area may store data (for example, audio data and an infrared code word) created according to usage of the terminal 100.

The display screen 130 may be configured to display information entered by a user or information provided for a user and various menus (for example, an infrared remote control menu) of the terminal 100; and may also receive a user input. Specifically, the display screen 130 may include a display panel 131 and a touch panel 132. The display panel 131 may be configured in a form of an LCD (Liquid Crystal Display, liquid crystal display), an OLED (Organic Light-Emitting Diode, organic light-emitting diode), or the like. The touch panel 132, also referred to as a touchscreen, a touch-sensitive screen, or the like, may collect a touch or non-touch operation performed by a user on or near the touch panel 132 (for example, an operation performed on or near the touch panel 132 by the user by using a finger, a stylus, or any other suitable object or accessory; and a motion sensing operation may also be included, where the operation includes a single-point control operation, a multi-point control operation, and other types of operations), and drive a corresponding connection apparatus according to a preset program.

The audio frequency circuit 140, a loudspeaker 141, and a microphone 142 may provide an audio interface between the user and the terminal 100. The audio frequency circuit 140 may transmit, to the loudspeaker 141, a signal that is obtained by converting received audio data. The loudspeaker 141 converts the signal into a sound signal and outputs the sound signal. In addition, the microphone 142 converts a collected sound signal into an electrical signal. The audio frequency circuit 140 receives the electrical signal, converts the electrical signal into audio data, and outputs the audio data to the RF circuit 110, to send the audio data to, for example, another terminal, or outputs the audio data to the memory 120 for further processing.

An infrared transmitter 25 is connected to an audio output port or audio input port of the audio frequency circuit 140 by using a transfer switch (not shown in the figure). If the infrared transmitter 25 changes to be connected to the audio output port of the audio frequency circuit 140, that is, a differential audio output channel of the audio frequency circuit 140 is reused, an infrared remote control signal may be generated by using the audio frequency circuit 140, and the infrared transmitter 25 is driven by means of differential output to transmit the infrared remote control signal. If the infrared transmitter 25 changes to be connected to the audio input port of the audio frequency circuit 140, that is, a differential audio input channel of the audio frequency circuit 140 is reused, an infrared learning signal formed by the infrared transmitter 25 by means of photoelectric sensing may be input to the audio frequency circuit 140 by using the differential audio input channel, and the infrared learning signal is processed by using the audio frequency circuit 140, so that an envelope length and a carrier frequency of the infrared learning signal is obtained, and learning on an infrared remote control code word is implemented.

The processor 150, a control center of the terminal 100, is connected to various parts of the entire terminal by using various interfaces and lines, and executes various functions of the terminal 100 and processes data by running or executing the software program and/or the module stored in the memory 120 and invoking data stored in the memory 120, so as to perform overall monitoring on the terminal. Optionally, the processor 150 may include one or more processing units. An application processor and a modem processor may be integrated in the processor 150. The application processor mainly processes an operating system, a user interface, an application program, and the like. The modem processor mainly handles wireless communication.

In this embodiment, the processor 150 is further configured to obtain an infrared remote control parameter, and send the infrared remote control parameter to an audio codec chip of the audio frequency circuit 140. The infrared remote control parameter includes an envelope length and a carrier frequency of the infrared remote control signal. The infrared remote control parameter may be prestored in the memory 120, or a preset infrared code library may be stored in the memory 120, and the infrared code library may include infrared code words corresponding to several infrared remote controllers of known models. The terminal 100 may have an infrared remote control mode and an infrared learning mode. The display screen 130 may display the infrared remote control menu. The user may use the infrared remote control menu to switch a working mode of the terminal 100 between the infrared remote control mode and the infrared learning mode.

In the infrared remote control mode, the user may select a corresponding target infrared remote controller model by using the infrared remote control menu, and trigger the processor 150 to read, from the memory 120, an infrared remote control parameter corresponding to the target infrared remote controller model and send the infrared remote control parameter to the audio codec chip of the audio frequency circuit 140, so that an infrared remote control signal is generated by using the audio codec chip of the audio frequency circuit 140, and the infrared transmitter 25 is driven by means of differential output to transmit the infrared remote control signal. It can be understood that the audio codec chip of the audio frequency circuit 140 may directly read the infrared code word corresponding to the target infrared remote controller model from the memory 120, then obtain the infrared remote control parameter according to the infrared code word, and generate the infrared remote control signal according to the infrared remote control parameter.

In the infrared learning mode, the audio codec chip of the audio frequency circuit 140 may read, by using the differential audio input channel, the infrared learning signal formed by the infrared transmitter 25, complete processing on the infrared learning signal by using the audio frequency circuit 140, obtain an envelope length and a carrier frequency of the infrared learning signal, and use the envelope length and the carrier frequency of the infrared learning signal as the envelope length and the carrier frequency of the infrared remote control signal, respectively. In addition, the envelope length and the carrier frequency of the infrared learning signal may be stored in the memory 120, so as to implement learning on the infrared remote control code word.

In addition, the terminal 100 may further include the power supply 160 (for example, a battery) that supplies power to each component. The power supply may be logically connected to the processor 150 by using a power management system, so as to implement functions such as charge management, discharge management, and power consumption management by using the power management system. It can be understood that the terminal 100 may further include a camera, a Bluetooth module, and the like, and details are not described herein again.

Figure 2:
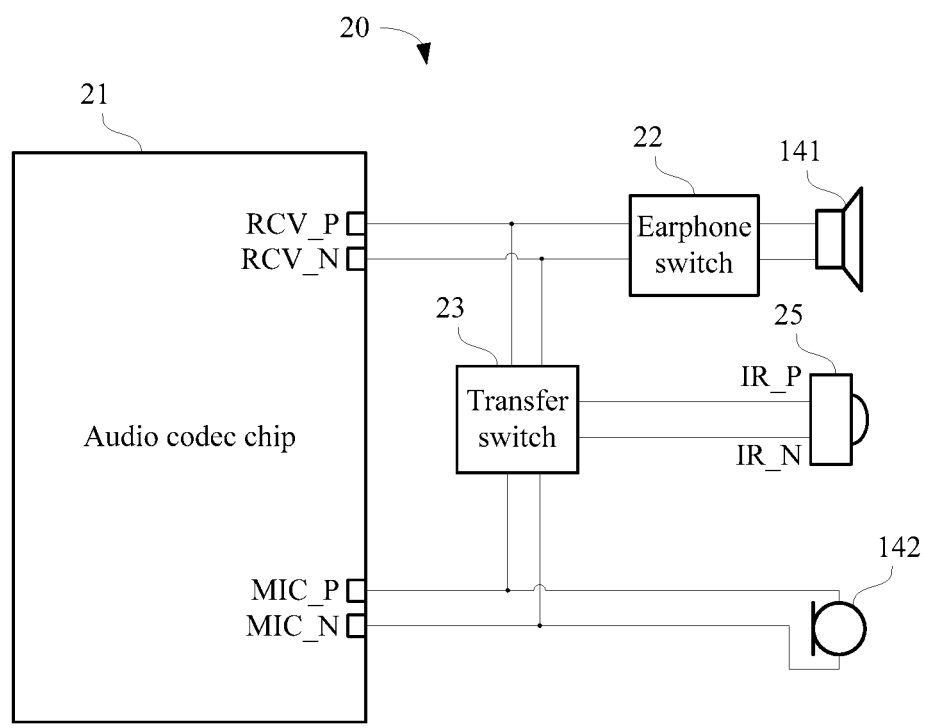
FIG. 2 is a first schematic structural diagram of an infrared remote control apparatus according to an embodiment of the present invention.

Referring to FIG. 2, an embodiment of the present invention provides an infrared remote control apparatus 20 reusing an audio frequency circuit. The apparatus includes an audio codec chip 21, a transfer switch 23, and an infrared transmitter 25. The audio codec chip 21 includes a pair of differential output pins RCV_P and RCV_N and a pair of differential input pins MIC_P and MIC_N. The infrared transmitter 25 is connected to the differential output pins RCV_P and RCV_N or the differential input pins MIC_P and MIC_N by using the transfer switch 23. The audio codec chip 21 is configured to obtain an infrared remote control parameter, generate an infrared remote control signal according to the infrared remote control parameter, and drive the infrared transmitter 25 by using the differential output pins RCV_P and RCV_N to transmit the infrared remote control signal. The infrared transmitter 25 is further configured to obtain an infrared learning signal. The audio codec chip 21 is further configured to read the infrared learning signal by using the differential input pins MIC_P and MIC_N, and calculate an envelope length and a carrier frequency of the infrared learning signal.

In the infrared remote control apparatus 20, both transmitting of the infrared remote control signal and receiving of the infrared learning signal are implemented by means of differential transmission, and an anti-interference capability against a noise signal is strong. This helps to improve remote control and learning performance of the infrared remote control apparatus 20. In addition, the audio codec chip 21 is also used to process the infrared remote control signal and the infrared learning signal, and an independent infrared codec chip is not required. This can effectively reduce costs for implementing infrared remote control. Moreover, a differential signal can directly drive the infrared transmitter 25, and there is no need to provide an independent power supply for the infrared transmitter 25. This helps to further reduce generation costs.

Specifically, the audio codec chip 21 may be an audio codec chip included in the audio frequency circuit 140 of the terminal 100. The differential output pins RCV_P and RCV_N are further configured to be connected to a loudspeaker 141 by using an earphone switch 22, to drive, by using an audio differential signal, the loudspeaker 141 to sound. The differential input pins MIC_P and MIC_N are further configured to be connected to a microphone 142, to receive an audio differential signal collected by the microphone 142. The earphone switch 22 and the transfer switch 23 may be connected to a general purpose input/output (General Purpose Input/Output, GPIO) port of the processor 150 of the terminal 100, so that an on/off status is changed according to a change of a GPIO output level of the processor 150, and the audio codec chip 21 is configured on an audio input/output channel or an infrared remote control channel.

In this embodiment, the configuring the audio codec chip 21 on an audio input/output channel means that: The processor 150 controls the earphone switch 22 to be switched on, so that a positive input end and a negative input end of the loudspeaker 141 are connected to the differential output pins RCV_P and RCV_N, respectively; and controls the transfer switch 23 to disconnect the infrared transmitter 25 from the differential output pins RCV_P and RCV_N and the differential input pins MIC_P and MIC_N. The configuring the audio codec chip 21 on an infrared remote control channel means that: The processor controls the earphone switch 22 to be switched off, and controls the transfer switch 23 to connect the infrared transmitter 25 to the differential output pins RCV_P and RCV_N or the differential input pins MIC_P and MIC_N. The infrared transmitter 25 includes a positive pole IR_P and a negative pole IR_N. If the positive pole IR_P and the negative pole IR_N of the infrared transmitter 25 are connected to the differential output pins RCV_P and RCV_N, respectively, an infrared transmitting channel is formed. If the positive pole IR_P and the negative pole IR_N of the infrared transmitter 25 are connected to the differential input pins MIC_P and MIC_N, respectively, an infrared learning channel is formed.

Figure 3:
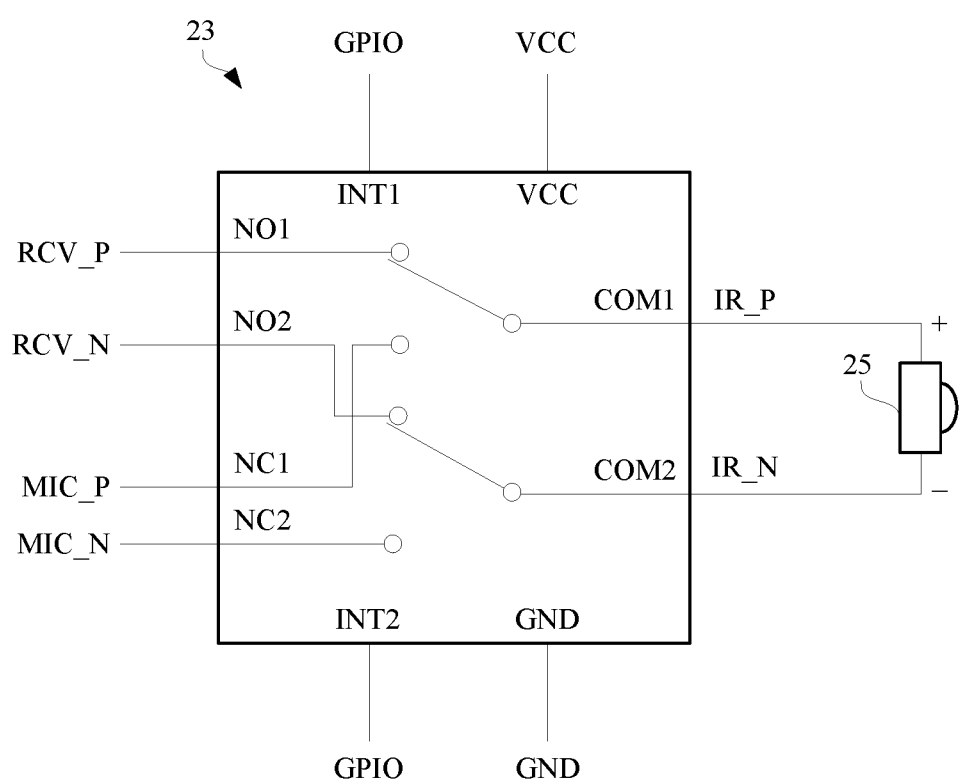
FIG. 3 is a schematic structural diagram of a transfer switch of an infrared remote control apparatus according to an embodiment of the present invention.

Referring to FIG. 3, the transfer switch 23 includes a first input pin NO1, a second input pin NO2, a first output pin NC1, a second output pin NC2, a first input/output pin COM1, a second input/output pin COM2, control pins INT1 and INT2, a power-supply pin VCC, and a grounding pin GND.

The first input pin NO1 is connected to a positive pin RCV_P of the differential output pins, and the second input pin NO2 is connected to a negative pin RCV_N of the differential output pins. The first output pin NC1 is connected to a positive pin MIC_P of the differential input pins, and the second output pin NC2 is connected to a negative pin MIC_N of the differential input pins. The first input/output pin COM1 is connected to the positive pole IR_P of the infrared transmitter 25, and the second input/output pin COM2 is connected to the negative pole IR_N of the infrared transmitter 25.

The control pins INT1 and INT2 are configured to be connected to the GPIO of the processor 150, to receive a switching control signal output by the GPIO. The switching control signal is used to control the transfer switch 23 to connect the first input/output pin COM1 and the second input/output pin COM2 to the first input pin NO1 and the second input pin NO2, respectively, or to connect the first input/output pin COM1 and the second input/output pin COM2 to the first output pin NC1 and the second output pin NC2, respectively. The power-supply pin VCC is configured to input a power signal, and the grounding pin GND is configured to ground.

Figure 4:
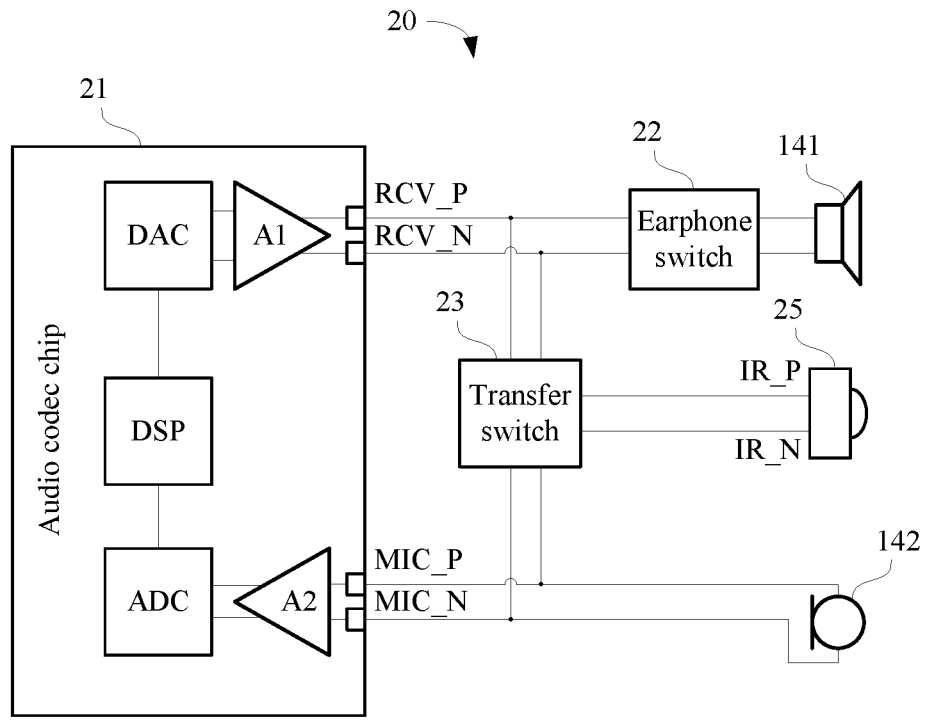
FIG. 4 is a second schematic structural diagram of an infrared remote control apparatus according to an embodiment of the present invention.
Figure 5:
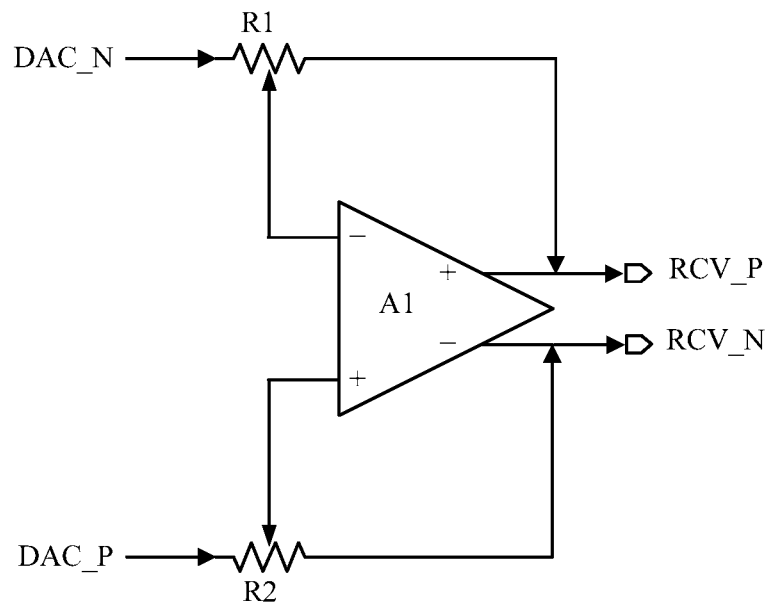
FIG. 5 is a schematic structural diagram of a first operational amplifier of an infrared remote control apparatus according to an embodiment of the present invention.
Figure 6:
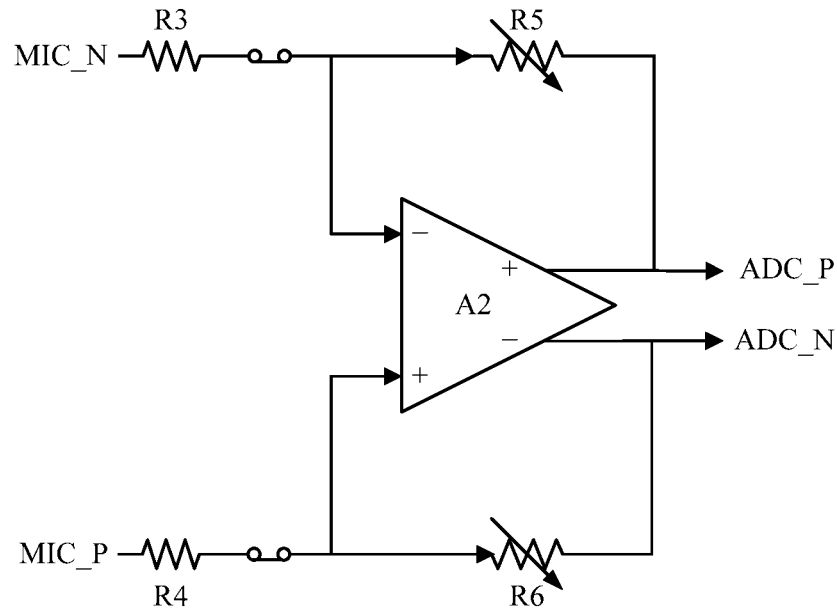
FIG. 6 is a schematic structural diagram of a second operational amplifier of an infrared remote control apparatus according to an embodiment of the present invention.

Referring to FIG. 4, the audio codec chip 21 further includes a digital signal processor DSP, a digital-to-analog converter DAC, a first operational amplifier A1, a second operational amplifier A2, and an analog-to-digital converter ADC. A structure of the first operational amplifier A1 is shown in FIG. 5, and a structure of the second operational amplifier A2 is shown in FIG. 6.

An output end of the digital signal processor DSP is connected to an input end of the digital-to-analog converter DAC. A positive differential signal output end DAC_P and a negative differential signal output end DAC_N of the digital-to-analog converter DAC are connected to a positive input end and a negative input end of the first operational amplifier A1, respectively. The positive input end and the negative input end of the first operational amplifier A1 are connected to a positive output end and a negative output end of the first operational amplifier A1 by using a first resistor R1 and a second resistor R2, respectively. The positive output end and the negative output end of the first operational amplifier A1 are connected to the positive pin RCV_P and the negative pin RCV_N of the differential output pins, respectively.

The digital signal processor DSP is configured to generate a digital modulation signal according to the infrared remote control parameter. The digital-to-analog converter DAC is configured to convert the digital modulation signal into a pair of differential infrared remote control signals. The first operational amplifier A1 is configured to amplify the differential infrared remote control signals, and drive the infrared transmitter 25 by using the differential infrared remote control signals.

In this embodiment, the memory 120 is coupled to the audio codec chip 21. Envelope lengths and carrier frequencies of an infrared remote control signal that are corresponding to several infrared remote controllers of known models may be stored in the memory 120. An infrared remote control program may be installed in and run on the terminal 100. A user may select a corresponding remote controller model by using the infrared remote control program, and send the selected remote controller model to the audio codec chip 21 by using the infrared remote control program. The audio codec chip 21 may obtain a corresponding envelope length and a corresponding carrier frequency of the infrared remote control signal from the memory 120 according to the remote controller model, so that the DSP of the audio codec chip 21 calculates, according to the envelope length and the carrier frequency, a quantity of carrier periods that need to be sent in high level duration of the infrared remote control signal and a quantity of zero levels that need to be sent in low level duration, and generates a digital modulation signal according to the quantity of carrier periods that need to be sent in the high level duration and the quantity of zero levels that need to be sent in the low level duration. The digital modulation signal is a digital sequence including several carrier periods and several zero levels. Further, the audio codec chip 21 converts the digital modulation signal into a pair of differential infrared remote control signals by using the built-in digital-to-analog converter DAC, and amplifies the differential infrared remote control signals by using the first operational amplifier A1, so as to drive the infrared transmitter 25 to transmit the infrared remote control signal.

A positive input end and a negative input end of the second operational amplifier A2 are connected to the positive pin MIC_P and the negative pin MIC_N of the differential input pins by using a third resistor R3 and a fourth resistor R4, respectively. The positive input end and the negative input end of the second operational amplifier A2 are also connected to a positive output end and a negative output end of the second operational amplifier A2 by using a fifth resistor R5 and a sixth resistor R6, respectively. The positive output end and the negative output end of the second operational amplifier A2 are connected to a positive differential signal input end ADC_P and a negative differential signal input end ADC_N of the analog-to-digital converter ADC, respectively. An output end of the analog-to-digital converter ADC is connected to an input end of the digital signal processor DSP.

The second operational amplifier A2 is configured to amplify the infrared learning signal. The analog-to-digital converter ADC is configured to convert the infrared learning signal into a digital learning signal. The digital signal processor DSP is further configured to calculate the envelope length and the carrier frequency of the infrared learning signal according to the digital learning signal.

Figure 7:
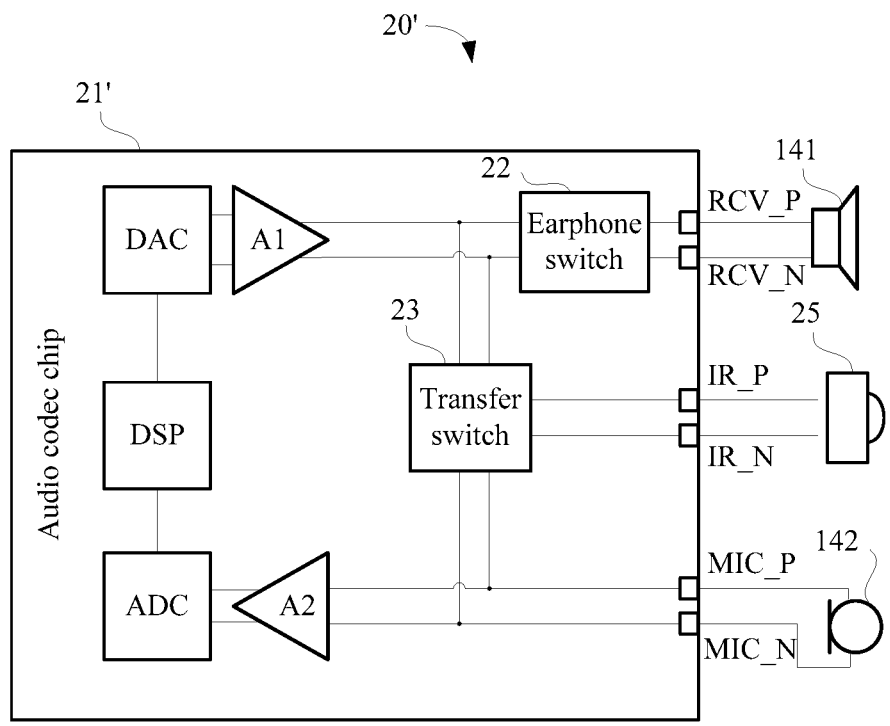
FIG. 7 is a third schematic structural diagram of an infrared remote control apparatus according to an embodiment of the present invention.

Referring to FIG. 7, an embodiment of the present invention provides an infrared remote control apparatus 20' reusing an audio frequency circuit. The infrared remote control apparatus 20' includes an audio codec chip 21', a transfer switch 23, and an infrared transmitter 25. A difference between the infrared remote control apparatus 20' and the infrared remote control apparatus 20 provided in the embodiment in FIG. 4 lies only in that: The earphone switch 22 and the transfer switch 23 are integrated in the audio codec chip 21'; the positive output end and the negative output end of the first operational amplifier A1 are respectively connected to the positive pin RCV_P and the negative pin RCV_N of the differential output pins by using the earphone switch 22; and the infrared transmitter 25 is connected to the positive output end and the negative output end of the first operational amplifier A1 (that is, differential output pins RCV_P and RCV_N of the audio codec chip 21') or the positive input end and the negative input end of the second operational amplifier A2 (that is, differential input pins MIC_P and MIC_N of the audio codec chip 21') by using the transfer switch 23. It can be understood that, for specific structures and functions of the transfer switch 23, reference may be made to the related description in the embodiment shown in FIG. 3, and details are not described herein again.

Figure 8:
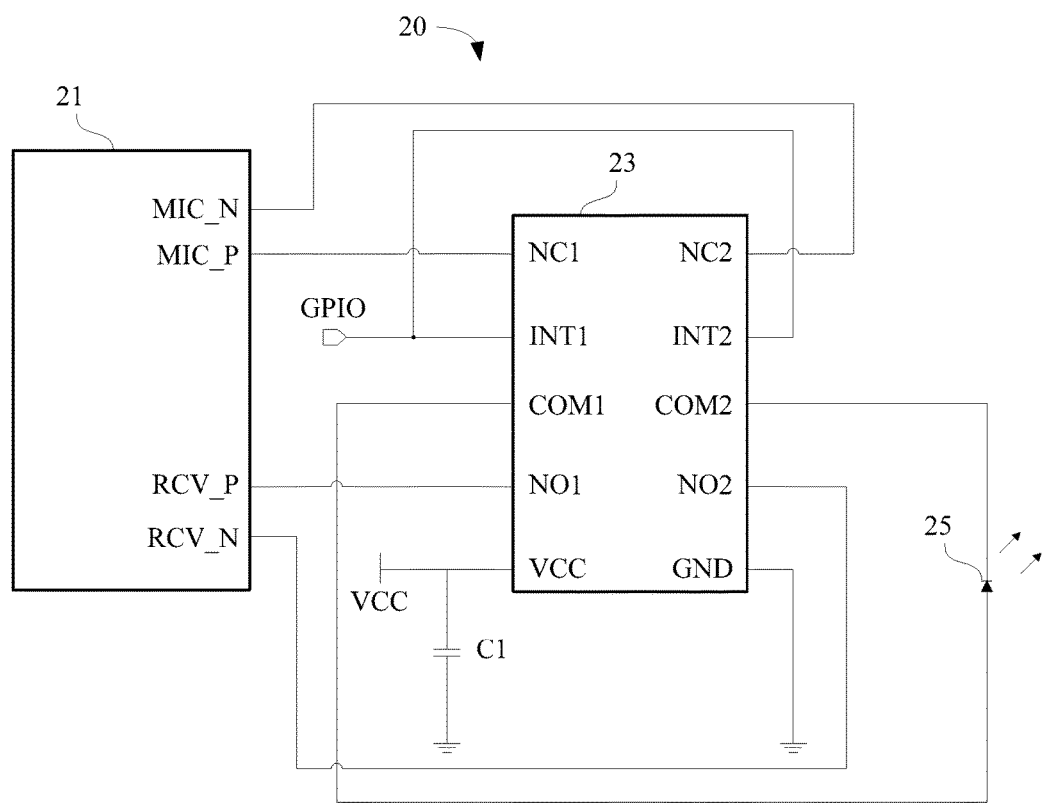
FIG. 8 is a schematic structural diagram of a circuit of an infrared remote control apparatus according to an embodiment of the present invention.

Referring to FIG. 8, FIG. 8 shows a circuit structure of the infrared remote control apparatus 20 reusing an audio frequency circuit according to an embodiment of the present invention. For a structure of the audio codec chip 21, reference may be made to the descriptions of the embodiments shown in FIG. 4 to FIG. 6. For a structure of the transfer switch 23, reference may be made to the descriptions of the embodiment shown in FIG. 3. Details are not described herein again. The power-supply pin VCC of the transfer switch 23 may be connected to the power supply 160 of the terminal shown in FIG. 1, and grounded by using a capacitor C1, so as to perform filtering on a power signal input to the power-supply pin VCC. The first input/output pin COM1 of the transfer switch 23 is connected to the positive pole IR_P of the infrared transmitter 25, and the second input/output pin COM2 is connected to the negative pole IR_N of the infrared transmitter 25. The control pins INT1 and INT2 are connected and connected together to the GPIO of the processor 150 of the terminal 100 shown in FIG. 1, so as to control, according to a switching control signal output from the GPIO, the transfer switch 23 to connect an infrared remote control channel or an infrared learning channel.

In this embodiment, the infrared remote control parameter includes an envelope length and a carrier frequency. When the transfer switch 23 is switched to connect the infrared remote control channel, the audio codec chip 21 is further configured to:

calculate first level duration and second level duration of an infrared remote control signal according to the envelope length, and calculate a carrier period according to the carrier frequency; calculate, according to the first level duration and the carrier period, a quantity of carrier periods that need to be sent in the first level duration; if the quantity of the carrier periods that need to be sent in the first level duration is a non-integer, round up the quantity of the carrier periods, and add a corresponding zero-fill time to the first level duration, where a length of the zero-fill time is equal to a length by which a rounded-up quantity of carrier periods exceeds the quantity of the carrier periods that need to be sent in the first level duration; and subtract the zero-fill time from the second level duration, and calculate, according to a length of second level duration obtained after the zero-fill time is subtracted, a quantity of zero levels that need to be sent in the second level duration.

Specifically, the infrared remote control parameter may be set by infrared remote control software running on the terminal 100. For example, infrared remote control parameters corresponding to infrared remote controllers of different models may be prestored in the memory 120 of the terminal 100. A user may select a corresponding remote controller model by using the infrared remote control software, and then the processor 150 reads a corresponding infrared remote control parameter according to the remote controller model and sends the infrared remote control parameter to the audio codec chip 21.

Figure 9:
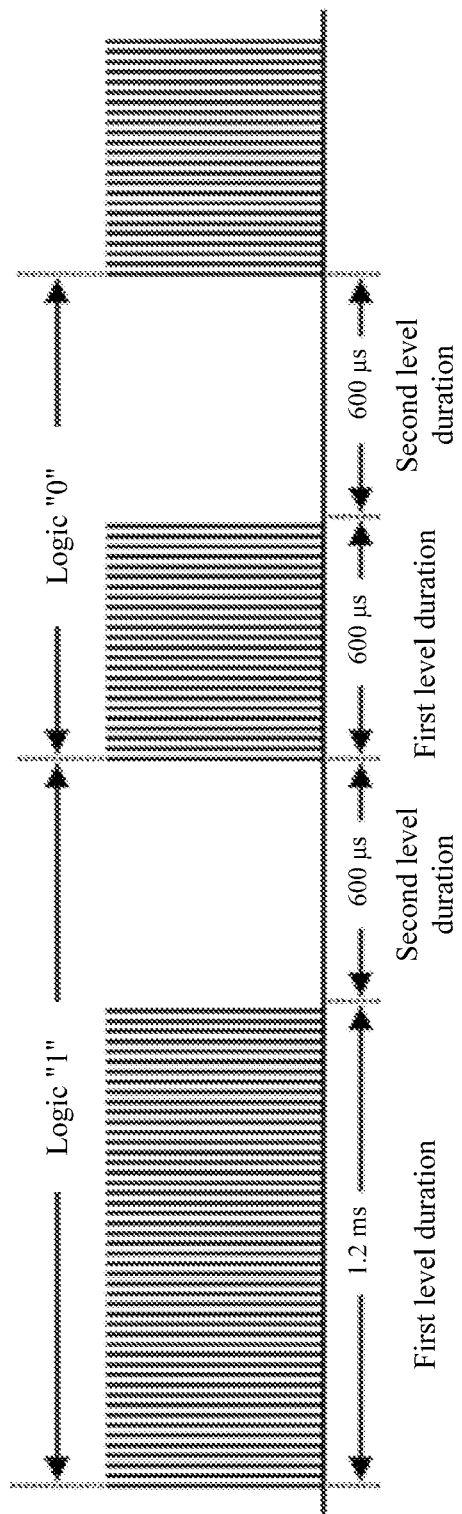
FIG. 9 is a schematic waveform diagram of an infrared remote control signal of an infrared remote control apparatus according to an embodiment of the present invention.

The envelope length may include high level (logic 1) duration and low level (logic 0) duration of the infrared remote control signal. The high level duration may include specific first level duration and specific second level duration. The low level duration may similarly include specific first level duration and specific second level duration. The first level duration may include multiple carrier periods. The second level duration may include multiple zero levels. It can be understood that high levels and low levels of infrared remote controllers of different models may be corresponding to different first level durations and different second level durations. As shown in FIG. 9, a high level duration of the infrared remote control signal may be 1.8 milliseconds (ms), including a 1.2 ms first level duration and a 600-microsecond (μs) second level duration; and a low level duration may be 1.2 ms, including a 600 μs first level duration and a 600 μs second level duration.

It can be understood that a carrier frequency of the infrared remote control signal may be any value ranging from 22 kHz to 56 kHz. After the carrier frequency of the infrared remote control signal, the first level duration and the second level duration corresponding to the high level, and the first level duration and the second level duration corresponding to the low level that need to be generated are obtained, if the quantity of carrier periods that need to be sent in the first level duration is a non-integer, that is, the first level duration is not divisible by a carrier period, the quantity of the carrier periods is rounded up, and a corresponding zero-fill time is added after the first level duration, so as to ensure that the quantity of the carrier periods sent in the first level duration is an integer, and an accumulative error is prevented. A length of the zero-fill time is equal to a length by which a rounded-up quantity of carrier periods exceeds the quantity of the carrier periods sent in the first level duration. For example, in an RCMM protocol, the first first level duration is 211 microseconds (ρs), a carrier frequency is 36 kHz, and one carrier period is 27.8 μs. The first level duration 211 μs includes 7.59 carrier periods, that is, the first level duration is not divisible by the carrier period. In this case, the quantity of the carrier periods is rounded up to obtain eight carrier periods, and a corresponding zero-fill time is added after the first level duration. A length of the zero-fill time is equal to a length by which a rounded-up quantity of carrier periods exceeds the quantity of carrier periods included in the first level duration, that is, a length of 0.41 carrier period: 0.41×27.8 μs=11.398 μs.

The zero-fill time is added after the first level duration, and the zero-fill time actually occupies a part of the second level duration immediately following the first level duration. Therefore, to ensure that a generated infrared modulation signal fully matches a desired infrared modulation signal, the zero-fill time needs to be subtracted from the second level duration, and the quantity of zero levels that need to be sent in the second level duration is calculated according to a length of second level duration obtained after the zero-fill time is subtracted.

After the quantity of carrier periods that need to be sent in the first level duration, the zero-fill time, and the quantity of zero levels that need to be sent in the second level duration are determined, the audio codec chip is further configured to:

generate multiple consecutive carrier points in the first level duration and the zero-fill time, where two adjacent carrier points are separated by one carrier period; generate multiple consecutive zero level points in the second level duration obtained after the zero-fill time is subtracted; and generate, according to the multiple consecutive carrier points and the multiple consecutive zero level points, the infrared remote control signal corresponding to the infrared remote control parameter.

In this embodiment, when the quantity of the carrier periods that need to be sent in the first level duration is a non-integer, the quantity of the carrier periods is rounded up to obtain an integer, and the zero-fill time corresponding to a length, by which the rounded-up quantity of the carrier periods exceeds the quantity of the carrier periods that need to be sent in the first level duration, is added after the first level duration. This ensures that the first level duration plus the zero-fill time is exactly an integer multiple of the carrier period, so as to prevent occurrence of an accumulative error.

When the transfer switch 23 is switched to connect an infrared learning channel, the audio codec chip 21 is further configured to:

sample the infrared learning signal by using a first sampling frequency, to obtain a first sampled signal, and down-sample the first sampled signal by using a second sampling frequency, to obtain a second sampled signal; and calculate an envelope length of the infrared learning signal according to the second sampled signal, and calculate first level duration and second level duration of the infrared learning signal according to the envelope length, where the first sampling frequency is a maximum sampling frequency of the audio codec chip, and the second sampling frequency is less than the first sampling frequency.

Specifically, when the infrared learning channel is connected, the infrared transmitter 25 may obtain a corresponding infrared learning signal by means of a photoelectric effect, the infrared learning signal is input to the audio codec chip 21 by using both the differential audio input pins MIC_P and MIC_N of the terminal 100, and the audio codec chip 21 samples and processes the infrared learning signal. In this embodiment, the first sampling frequency is a maximum sampling frequency supported by the terminal 100, for example, 6.144 MHz, and the second sampling frequency may be an audio sampling frequency of the terminal 100, for example, 192 kHz.

It can be understood that during infrared learning, to accurately obtain the envelope length and the carrier frequency of the infrared learning signal, it is required to use a high-powered oversampling frequency to sample the infrared learning signal, so as to ensure data accuracy. However, in the embodiments of the present invention, the DSP in the audio codec chip 21 of the terminal 100 is used to process the infrared learning signal. Therefore, if the sampling frequency of 6.144 MHz is directly used, an excessively large quantity of operational resources are required for processing the infrared learning signal, and the DSP in the audio codec chip 21 may not satisfy this requirement. Therefore, in this embodiment, infrared remote control signal learning is divided into two parts: envelope learning and carrier learning, which are completed by using an envelope learning algorithm and a carrier learning algorithm, respectively. Because an envelope of the infrared learning signal is a low frequency signal, a sampling frequency of 192 kHz can satisfy a signal reconstruction requirement. In addition, down-sampling can reduce the required operational resources of the audio codec chip 21, and reduce power consumption of the infrared remote control apparatus. In this embodiment, to increase an infrared learning distance of the infrared remote control apparatus, a gain of the second operational amplifier A2 may be adjusted to 50 dB, and a corresponding infrared learning distance can be up to 1.4 meters.

In this embodiment, after the envelope learning algorithm detects that there is valid envelope data, the carrier learning algorithm is started after a preset time period, so that carrier learning starts. Infrared learning duration may be 2 seconds, and the preset time period may be 250 ms.

During the carrier learning, the audio codec chip 21 is further configured to: sample the infrared learning signal by using a first sampling frequency, to obtain a first sampled signal; search in a preset time window to find whether there are consecutive high level sampling points in the first sampled signal; if there are consecutive high level sampling points, calculate a carrier frequency in the preset time window according to the first sampled signal; and sequentially calculate carrier frequencies in multiple consecutive preset time windows, and determine the carrier frequency of the infrared learning signal according to the carrier frequencies in the multiple consecutive preset time windows.

The carrier frequency of the infrared remote control signal may be any value ranging from 22 kHz to 56 kHz. Therefore, for carrier learning, an oversampling frequency of 6.144 MHz needs to be used to ensure accuracy of the sampled signal. In this embodiment, the preset time window may be 2 ms, and a quantity of sampling points in each preset time window is 6.144M×0.002=12288. If the sampling points are traversed one by one in each preset time window to detect whether there are consecutive high level sampling points, 3.7 ms is required to complete detection in each preset time window, exceeding the window duration of 2 ms.

It can be understood that a carrier frequency ranges from 22 kHz to 56 kHz, and a carrier period ranges from 45 µs to 17.9 µs, that is, a quantity of sampling points in each carrier period ranges from 109.98 to 276.48. It is assumed that a duty cycle of a carrier is 33.3%, one high level sampling point is included in at least 30 sampling points. Therefore, in this embodiment, a search may be performed according to a preset search spacing, to find whether there is a high level sampling point in the first sampled signal; if there is a high level sampling point, a search is performed in a first preset range including the high level sampling point, to find whether there are consecutive high level sampling points. The preset search spacing may be 20 to 30 sampling points. If a high level sampling point is found in the first sampled signal, to eliminate possible noise, a search is further performed in the first preset range including the high level sampling point, to find whether there are consecutive high level sampling points. For example, the first preset range may cover the high level sampling point, five sampling points obtained before the high level sampling point, and five sampling points obtained after the high level sampling point. If there are consecutive high level sampling points, the signal can be determined as a carrier signal.

After the signal is determined as a carrier signal, the audio codec chip is further configured to:

calculate, according to the first sampled signal, a carrier frequency of the infrared learning signal in the preset time window in a second preset range including the high level sampling point, where the second preset range includes the first preset range.

In this embodiment, the second preset range may be 100 sampling points obtained before the high level sampling point and 300 sampling points obtained after the high level sampling point. After the carrier frequency of the infrared learning signal in the preset time window is calculated, remaining data in the preset time window may be discarded, and next three to five 2 ms preset time windows may be selected for calculating the carrier frequency of the infrared learning signal. It can be understood that, in this embodiment, because carrier learning starts in 250 ms after the valid envelope data is detected in the envelope learning, data in the first preset time window may be exactly a low level signal or a high level signal including some noise. In this case, the data in the preset time window may be directly discarded, and data in a next preset time window is processed.

In the infrared remote control apparatus in which the audio frequency circuit is also used in the embodiments of the present invention, both transmitting of the infrared remote control signal and receiving of the infrared learning signal are implemented by means of differential transmission. Therefore, an anti-interference capability against a noise signal is strong, an EMI anti-interference device such as a magnetic bead and a filter capacitor can be saved, and an area occupied by the infrared remote control circuit on a board is reduced. In addition, a DSP resource inside the audio codec chip of an audio frequency circuit is directly used to process the infrared remote control signal and the infrared learning signal, and an independent infrared codec chip is not required. This can effectively reduce costs for implementing infrared remote control. In addition, because a differential signal can directly drive the infrared transmitter, there is no need to set an independent power supply for the infrared transmitter. This helps to further reduce generation costs.

What is claimed is:

1. An infrared remote control apparatus, comprising an audio codec chip, a transfer switch, and an infrared transmitter, wherein
   the audio codec chip comprises a pair of differential output pins and a pair of differential input pins, and the infrared transmitter is connected to the differential output pins and the differential input pins by using the transfer switch; wherein
   the transfer switch is configured to set up a connection between the infrared transmitter and the differential output pins;
   the infrared transmitter is configured to obtain an infrared learning signal; and
   the audio codec chip is configured to:
      obtain an infrared remote control parameter, wherein the infrared remote control parameter comprises an envelope length and a carrier frequency of an infrared remote control signal;
      generate the infrared remote control signal according to the envelope length and the carrier frequency;
      drive, by using the differential output pins, the infrared transmitter to transmit the infrared remote control signal when the connection between the infrared transmitter and the differential output pins is established; and
      when the transfer switch sets up a connection between the infrared transmitter and the differential input pins:
         read the infrared learning signal by using the differential input pins;
         calculate an envelope length and a carrier frequency of the infrared learning signal; and
         use the envelope length and the carrier frequency of the infrared learning signal as the envelope length and the carrier frequency of the infrared remote control signal, respectively.

2. The infrared remote control apparatus according to claim 1, wherein the audio codec chip further comprises a digital signal processor, a digital-to-analog converter, and a first operational amplifier, wherein
   an output end of the digital signal processor is connected to an input end of the digital-to-analog converter;
   a positive differential signal output end and a negative differential signal output end of the digital-to-analog converter are connected to a positive input end and a negative input end of the first operational amplifier, respectively; and a positive output end and a negative output end of the first operational amplifier are connected to a positive pin and a negative pin of the differential output pins, respectively; and wherein the digital signal processor is configured to generate a digital modulation signal according to the infrared remote control parameter;

wherein the digital-to-analog converter is configured to convert the digital modulation signal into a pair of differential infrared remote control signals; and wherein the first operational amplifier is configured to:
  amplify the differential infrared remote control signals; and
  drive the infrared transmitter by using the differential infrared remote control signals.

3. The infrared remote control apparatus according to claim 2, wherein the audio codec chip further comprises a second operational amplifier and an analog-to-digital converter, wherein a positive input end and a negative input end of the second operational amplifier are connected to a positive pin and a negative pin of the differential input pins, respectively;

a positive output end and a negative output end of the second operational amplifier are connected to a positive differential signal input end and a negative differential signal input end of the analog-to-digital converter, respectively; and an output end of the analog-to-digital converter is connected to an input end of the digital signal processor; and wherein the second operational amplifier is configured to amplify the infrared learning signal;

wherein the analog-to-digital converter is configured to convert the infrared learning signal into a digital learning signal; and wherein the digital signal processor is further configured to calculate the envelope length and the carrier frequency of the infrared learning signal according to the digital learning signal.

4. The infrared remote control apparatus according to claim 1, wherein the audio codec chip is further configured to:

sample the infrared learning signal by using a first sampling frequency to obtain a first sampled signal;
down-sample the first sampled signal by using a second sampling frequency to obtain a second sampled signal;
calculate the envelope length of the infrared learning signal according to the second sampled signal; and
calculate first level duration and second level duration of the infrared learning signal according to the envelope length, wherein
the first sampling frequency is a maximum sampling frequency of the audio codec chip, and the second sampling frequency is less than the first sampling frequency.

5. The infrared remote control apparatus according to claim 1, wherein the audio codec chip is further configured to:

sample the infrared learning signal by using a first sampling frequency, to obtain a first sampled signal;
search in a preset time window to determine whether there are consecutive high level sampling points in the first sampled signal;

in response to determining that there are consecutive high level sampling points, calculate a carrier frequency in the preset time window according to the first sampled signal;
sequentially calculate carrier frequencies in multiple consecutive preset time windows; and
determine the carrier frequency of the infrared learning signal according to the carrier frequencies in the multiple consecutive preset time windows.

6. The infrared remote control apparatus according to claim 5, wherein the audio codec chip is further configured to:

search, in the preset time window according to a preset search spacing, to determine whether there is a high level sampling point in the first sampled signal; and
in response to determining that there is a high level sampling point, search, in a first preset range comprising the high level sampling point, to determine whether there are consecutive high level sampling points.

7. The infrared remote control apparatus according to claim 6, wherein the audio codec chip is further configured to:

calculate, according to the first sampled signal, a carrier frequency of the infrared learning signal in the preset time window in a second preset range comprising the high level sampling point, wherein
the second preset range comprises the first preset range.

8. The infrared remote control apparatus according to claim 1, wherein the audio codec chip is further configured to:

calculate first level duration and second level duration of the infrared remote control signal according to the envelope length;
calculate a carrier period according to the carrier frequency;
calculate, according to the first level duration and the carrier period, a quantity of carrier periods to be sent in the first level duration;
when the quantity of the carrier periods to be sent in the first level duration is a non-integer:
  round up the quantity of the carrier periods; and
  add a corresponding zero-fill time after the first level duration, wherein a length of the zero-fill time is equal to a length by which a rounded-up quantity of the carrier periods exceeds the quantity of the carrier periods to be sent in the first level duration;
subtract the zero-fill time from the second level duration; and
calculate, according to a length of second level duration obtained after the zero-fill time is subtracted, a quantity of zero levels to be sent in the second level duration.

9. The infrared remote control apparatus according to claim 8, wherein the audio codec chip is further configured to:

generate multiple consecutive carrier points in the first level duration and the zero-fill time, wherein adjacent carrier points are separated by one carrier period;
generate multiple consecutive zero level points in the second level duration obtained after the zero-fill time is subtracted; and
generate, according to the multiple consecutive carrier points and the multiple consecutive zero level points, the infrared remote control signal corresponding to the infrared remote control parameter.

10. A terminal, comprising a memory and an infrared remote control apparatus, wherein the memory is coupled to an audio codec chip and is configured to store an infrared remote control parameter of the infrared remote control apparatus, wherein the infrared remote control apparatus comprises: an audio codec chip, a transfer switch, and an infrared transmitter, wherein the audio codec chip comprises a pair of differential output pins and a pair of differential input pins, and the infrared transmitter is connected to the differential output pins and the differential input pins by using the transfer switch;

the infrared transmitter is configured to obtain an infrared learning signal; and the audio codec chip is configured to:
obtain an infrared remote control parameter, wherein the infrared remote control parameter comprises an envelope length and a carrier frequency of an infrared remote control signal;
generate the infrared remote control signal according to the envelope length and the carrier frequency;
when the transfer switch sets up a connection between the infrared transmitter and the differential output pins, drive, by using the differential output pins, the infrared transmitter to transmit the infrared remote control signal; and
when the transfer switch sets up a connection between the infrared transmitter and the differential input pins:
read the infrared learning signal by using the differential input pins;
calculate an envelope length and a carrier frequency of the infrared learning signal; and
use the envelope length and the carrier frequency of the infrared learning signal as the envelope length and the carrier frequency of the infrared remote control signal, respectively.

11. The terminal according to claim 10, wherein the audio codec chip further comprises a digital signal processor, a digital-to-analog converter, and a first operational amplifier, wherein an output end of the digital signal processor is connected to an input end of the digital-to-analog converter;
a positive differential signal output end and a negative differential signal output end of the digital-to-analog converter are connected to a positive input end and a negative input end of the first operational amplifier, respectively; and
a positive output end and a negative output end of the first operational amplifier are connected to a positive pin and a negative pin of the differential output pins, respectively; and
wherein the digital signal processor is configured to generate a digital modulation signal according to the infrared remote control parameter;
wherein the digital-to-analog converter is configured to convert the digital modulation signal into a pair of differential infrared remote control signals; and
wherein the first operational amplifier is configured to:
amplify the differential infrared remote control signals; and
drive the infrared transmitter by using the differential infrared remote control signals.

12. The terminal according to claim 11, wherein the audio codec chip further comprises a second operational amplifier and an analog-to-digital converter, wherein a positive input end and a negative input end of the second operational amplifier are connected to a positive pin and a negative pin of the differential input pins, respectively;

a positive output end and a negative output end of the second operational amplifier are connected to a positive differential signal input end and a negative differential signal input end of the analog-to-digital converter, respectively; and an output end of the analog-to-digital converter is connected to an input end of the digital signal processor; and wherein the second operational amplifier is configured to amplify the infrared learning signal;

wherein the analog-to-digital converter is configured to convert the infrared learning signal into a digital learning signal; and wherein the digital signal processor is further configured to calculate the envelope length and the carrier frequency of the infrared learning signal according to the digital learning signal.

13. The terminal according to claim 10, wherein the audio codec chip is further configured to:

sample the infrared learning signal by using a first sampling frequency to obtain a first sampled signal;
down-sample the first sampled signal by using a second sampling frequency to obtain a second sampled signal;
calculate the envelope length of the infrared learning signal according to the second sampled signal; and
calculate first level duration and second level duration of the infrared learning signal according to the envelope length, wherein
the first sampling frequency is a maximum sampling frequency of the audio codec chip, and the second sampling frequency is less than the first sampling frequency.

14. The terminal according to claim 10, wherein the audio codec chip is further configured to:

sample the infrared learning signal by using a first sampling frequency, to obtain a first sampled signal;
search in a preset time window to determine whether there are consecutive high level sampling points in the first sampled signal;
in response to determining that there are consecutive high level sampling points, calculate a carrier frequency in the preset time window according to the first sampled signal;
sequentially calculate carrier frequencies in multiple consecutive preset time windows; and
determine the carrier frequency of the infrared learning signal according to the carrier frequencies in the multiple consecutive preset time windows.

15. The terminal according to claim 14, wherein the audio codec chip is further configured to:

search, in the preset time window according to a preset search spacing, to determine whether there is a high level sampling point in the first sampled signal; and
in response to determining that there is a high level sampling point, search, in a first preset range comprising the high level sampling point, to determine whether there are consecutive high level sampling points.

16. The terminal according to claim 10, wherein the memory is further configured to: store the envelope length and the carrier frequency of the infrared learning signal as the infrared remote control parameter of the infrared remote control apparatus.

17. The terminal according to claim 10, wherein the audio codec chip is further configured to:

calculate first level duration and second level duration of the infrared remote control signal according to the envelope length;

calculate a carrier period according to the carrier frequency;

calculate, according to the first level duration and the carrier period, a quantity of carrier periods to be sent in the first level duration;

when the quantity of the carrier periods that need to be sent in the first level duration is a non-integer:
 round up the quantity of the carrier periods; and
 add a corresponding zero-fill time after the first level duration, wherein a length of the zero-fill time is equal to a length by which a rounded-up quantity of the carrier periods exceeds the quantity of the carrier periods to be sent in the first level duration;

subtract the zero-fill time from the second level duration; and calculate, according to a length of second level duration obtained after the zero-fill time is subtracted, a quantity of zero levels to be sent in the second level duration.

18. The terminal according to claim 17, wherein the audio codec chip is further configured to:

generate multiple consecutive carrier points in the first level duration and the zero-fill time, wherein adjacent carrier points are separated by one carrier period;

generate multiple consecutive zero level points in the second level duration obtained after the zero-fill time is subtracted; and generate, according to the multiple consecutive carrier points and the multiple consecutive zero level points, the infrared remote control signal corresponding to the infrared remote control parameter.

19. An audio codec chip comprising a pair of differential output pins and a pair of differential input pins, wherein an infrared transmitter is connected to the differential output pins and the differential input pins by using a transfer switch, wherein the infrared transmitter is configured to obtain an infrared learning signal, wherein the transfer switch is configured to set up a connection between the infrared transmitter and the differential output pins, and wherein the audio codec chip is configured to:

obtain an infrared remote control parameter, wherein the infrared remote control parameter comprises an envelope length and a carrier frequency of an infrared remote control signal;

generate the infrared remote control signal according to the envelope length and the carrier frequency;

drive, by using the differential output pins, the infrared transmitter to transmit the infrared remote control signal when the connection between the infrared transmitter and the differential output pins is established; and when the transfer switch sets up a connection between the infrared transmitter and the differential input pins:
 read the infrared learning signal by using the differential input pins;
 calculate an envelope length and a carrier frequency of the infrared learning signal; and
 use the envelope length and the carrier frequency of the infrared learning signal as the envelope length and the carrier frequency of the infrared remote control signal, respectively.

* * * * *